United States Patent
Cahill et al.

(10) Patent No.: US 9,625,939 B2
(45) Date of Patent: Apr. 18, 2017

(54) CLOCK FORWARDING OVER OPTICS

(71) Applicant: International Business Machines Corporation, Armonk, NY (US)

(72) Inventors: Joseph J. Cahill, Austin, TX (US); Daniel M. Dreps, Georgetown, TX (US); Kaveh Naderi, Austin, TX (US); James E. Smith, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/831,399

(22) Filed: Aug. 20, 2015

(65) Prior Publication Data
US 2017/0052559 A1    Feb. 23, 2017

(51) Int. Cl.
*H04B 10/00*    (2013.01)
*G06F 1/12*    (2006.01)
*G06F 13/42*    (2006.01)

(52) U.S. Cl.
CPC ............ *G06F 1/12* (2013.01); *G06F 13/4282* (2013.01)

(58) Field of Classification Search
CPC ..... H04B 10/40; H04B 10/43; H04B 10/6165
USPC ....... 398/154, 155, 140, 141, 158, 159, 135, 398/136, 138, 79, 183, 202, 208, 209, 398/182
See application file for complete search history.

(56) References Cited

U.S. PATENT DOCUMENTS

| | | | |
|---|---|---|---|
| 7,706,693 B2 * | 4/2010 | Nonaka ................ | H04B 10/516 370/389 |
| 7,991,302 B2 * | 8/2011 | Xu ......................... | H03F 1/083 372/38.02 |
| 8,090,263 B2 | 1/2012 | Mussatt et al. | |
| 8,098,993 B2 | 1/2012 | Kirkpatrick et al. | |
| 2004/0228636 A1 * | 11/2004 | Pathak ..................... | H03L 7/18 398/155 |
| 2010/0098433 A1 | 4/2010 | Boyd et al. | |

FOREIGN PATENT DOCUMENTS

WO    2013162517 A1    10/2013

OTHER PUBLICATIONS

Logan, Shawn, "Determine the Compliance of a 100 MHz Reference Clock in a PCIe Application," EDN Network, Oct. 22, 2013, downloaded from <http://www.edn.com/design/systems-design/4423130/Determine-the-Compliance-of-a-100-MHz-Reference-Clock-in-a-PCIe-Application>, 8 pages.
IBM Knowledge Center, "PCIe Gen3 I/O expansion drawer," downloaded from <http://www-01.ibm.com/support/knowledgecenter/P8ESS/p8ham/p8ham_emx0_kickoff.htm> on Aug. 18, 2015, 1 page.

* cited by examiner

*Primary Examiner* — Hanh Phan
(74) *Attorney, Agent, or Firm* — Patterson + Sheridan, LLP

(57) ABSTRACT

Embodiments of the present disclosure provide an apparatus for synchronizing a common reference clock over optics. For example, a reference clock from a host device may be frequency adjusted based on a pass-band of an optical link, decoded, and converted into an optical signal, and transferred to a controller of a target device via one or more optical cables. The controller may be used to recover the reference clock using the optical signal, which may be used as a common-reference clock for communications between the host and target devices.

20 Claims, 6 Drawing Sheets

CLOCK FORWARDING OVER OPTICS

STATEMENT REGARDING PRIOR DISCLOSURES BY THE INVENTOR OR JOINT INVENTOR

The following disclosure is submitted under 35. U.S.C. 102(b)(1)(A): "PCIe Gen3 I/O expansion drawer," International Business Machines, Jun. 4, 2015, http://www-01.ibm.com/support/knowledgecenter/P8ESS/p8ham/p8ham_emx0_kickoff.htm.

BACKGROUND

Host systems often communicate with peripheral devices (e.g., a target device) via an interface such as the Peripheral Component Interconnect Express (PCIe) interface. A common (e.g., synchronized) reference clock may be used by host and target devices that are in communication via a communication interface such as PCIe. While separate clock architecture (e.g., an unsynchronized clocking scheme) may be used, separate clock architecture may not be supported by some systems.

SUMMARY

Certain embodiments of the present disclosure provide an apparatus for synchronizing a reference clock. The apparatus may generally include a frequency conversion device configured to: receive the reference clock from a first device; and convert a frequency of the reference clock based on an operating frequency of an electrical to optical converter; a controller configured to generate a decoded signal based on the frequency converted reference clock; the electrical to optical converter configured to: generate an optical signal based on the decoded signal; and send the optical signal over an optical cable.

Certain embodiments of the present disclosure provide an apparatus for synchronizing a reference clock. The apparatus may generally include an optical to electrical converter configured to: receive an optical signal over an optical cable; and generate an electrical signal based on the optical signal; a controller configured to generate an electrical clock signal based on the electrical signal; and a frequency conversion device configured to: convert a frequency of the electrical clock signal to generate the reference clock; and send the reference clock to a first device, wherein the reference clock is used as a common-reference clock input to the first device for communications between the first device and a second device.

Certain embodiments of the present disclosure provide a system for synchronizing a reference clock. The system generally includes a first frequency conversion device configured to: receive the reference clock from a first device; and convert a frequency of the reference clock based on an operating frequency of an electrical to optical converter; a first controller configured to generate a decoded signal based on the frequency converted reference clock; the electrical to optical converter configured to: generate an optical signal based on the decoded signal; and send the optical signal over an optical cable; and an optical to electrical converter configured to: receive the optical signal over the optical cable; and recover the decoded signal based on the optical signal; a second controller configured to generate an electrical clock signal based on the decoded signal; and a second frequency conversion device configured to: convert a frequency of the electrical clock signal to recover the reference clock; and send the reference clock to the second device.

DETAILED DESCRIPTION

Communication between one or more devices using a communication interface, such as Peripheral Component Interconnect Express (PCIe) may be performed using a common clock or separate clock architecture. That is, one or more devices (e.g., host and target devices) in communication may each operate using a separate clock, or using a common (e.g., synchronized) clock. Certain devices may only support using the common clock architecture. However, if the communication interface host device and target device are in separate domains (e.g., not in close proximity to one another), it may be difficult to synchronize the clocks used by the host and target devices for the common clock architecture. Embodiments of the present disclosure allow for a reference clock of a host and target device to be synchronized, even when the target and host devices are in separate domains.

Figure 1:
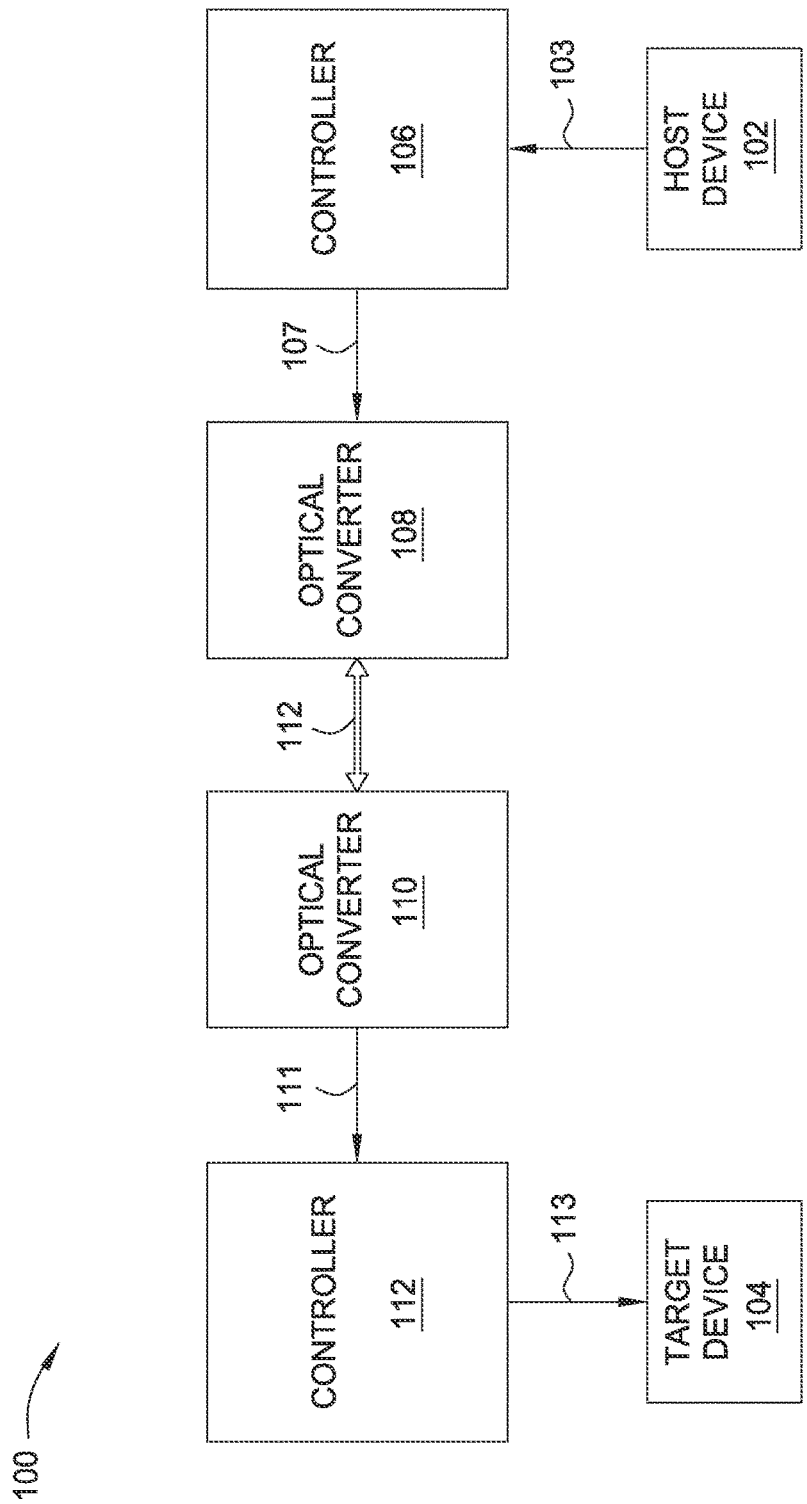
FIG. 1 is a block diagram of a system for synchronizing a reference clock, according to certain embodiments of the present disclosure.

FIG. 1 is a block diagram of a system 100 configured for synchronizing a reference clock signal 103 between a host device 102 and a target device 104, according to certain embodiments of the present disclosure. The host device 102 may operate using a reference clock signal 103 (e.g., to be used as a common reference clock for communication with the target device 104), which may have a frequency of about 100 Mhz, for example. The host device 102 may transfer the reference clock signal 103 to a controller 106, which may generate a decoded signal 107 based on the reference clock. In certain embodiments, the decoded signal may be generated by mapping 8-bit symbols to 10-bit symbols of the reference clock signal 103 to generate an 8B/10B decoded signal.

In certain embodiments, the decoded signal 107 may be generated via a serializer-deserializer (SERDES), which may be part of the controller 106. The decoded signal 107 may be sent to an optical converter 108, which converts the decoded signal to an optical signal. The optical signal generated by the optical converter 108 may be transferred to another optical converter 110, via one or more optical cables 120. The optical converter 110 may then use the optical signal received from the optical converter 108 to recover the decoded signal 107 by converting the optical signal to an electrical signal. Based on the recovered decoded signal 111, the controller 112 may recover the reference clock signal 103 that may be used as a common reference clock for communications between the host and target devices 102, 104. Thus, the controller 112 may send the recovered reference clock signal 113 to device 104 to be used as a common reference clock.

Figure 2:
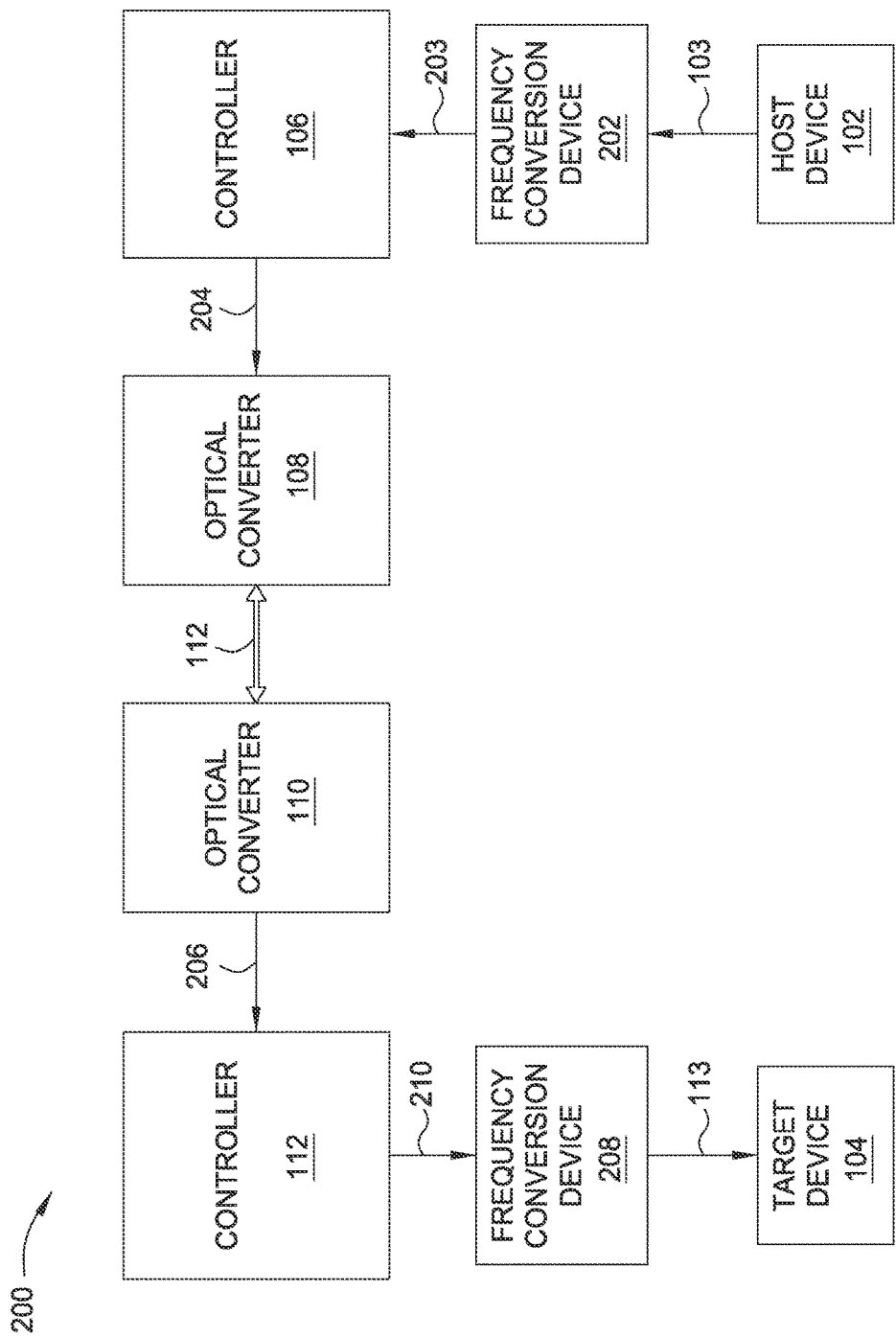
FIG. 2 is a block diagram of a system for synchronizing a reference clock using at least one frequency conversion device, according to certain embodiments of the present disclosure.

FIG. 2 is a block diagram of a system 200 for synchronizing a reference clock including at least one frequency conversion device, according to certain embodiments of the present disclosure. In some cases, the optical converter may be configured to operate within a specific bandwidth that may be higher or lower than the frequency of the reference clock signal 103. For example, the optical converter may be configured to operate at a frequency greater than 1 Ghz, and the reference clock may have a frequency of 100 Mhz. Thus, the reference clock signal 103 may be sent to a frequency conversion device 202, which may be configured to adjust the frequency of the reference clock based on an operating frequency of the optical converter 108. For example, the frequency of the reference clock may be increased to 1.25 Ghz, to be within the operating range (e.g., pass-band) of the optical converter 108.

Thus, the frequency conversion device 202 may send the frequency converted reference clock 203 to the controller 106, and the decoded signal 204 may be generated based on the frequency converted reference clock 203. The decoded signal 204 may be converted to an optical signal via optical converter 108, and sent to the optical converter 110 via optical cables 120. The decoded signal 204 is then recovered by the optical converter 110. The recovered decoded signal 206 is sent to the controller 112, which generates a recovered frequency converted reference clock 210 (e.g., 1.25 Ghz) via the decoded signal 206. Another frequency conversion device 208 may then be used to step down the frequency of the recovered clock 210 to generate a recovered reference clock 113. For example, the frequency conversion device 208 may step down the frequency of the reference clock 210 (e.g., which may be at 1.25 GHz) to 100 Mhz, to generate the recovered reference clock 113, which may be sent to the target device 104 to be used as a common-reference clock.

In certain embodiments, the frequency conversion devices 202, 208 may be part of the controllers 106, 112, respectively. Moreover, each of frequency conversion devices 202, 208 may include a plurality of frequency conversion units that work in conjunction to adjust the frequency of the reference clock signal 103 or 210. For example, a first frequency conversion unit of frequency conversion device 202 may increase the frequency of the reference clock to 125 Mhz, and a second frequency conversion unit of frequency conversion device 202 may increase the frequency of the 125 Mhz reference clock to 1.25 Ghz. In certain embodiments, the 125 Mhz reference clock may be used for logic operations of controller 106. In certain embodiments, at least one of the frequency conversion devices 202, 208 may be a phase-locked loop (PLL) circuit.

Figure 3:
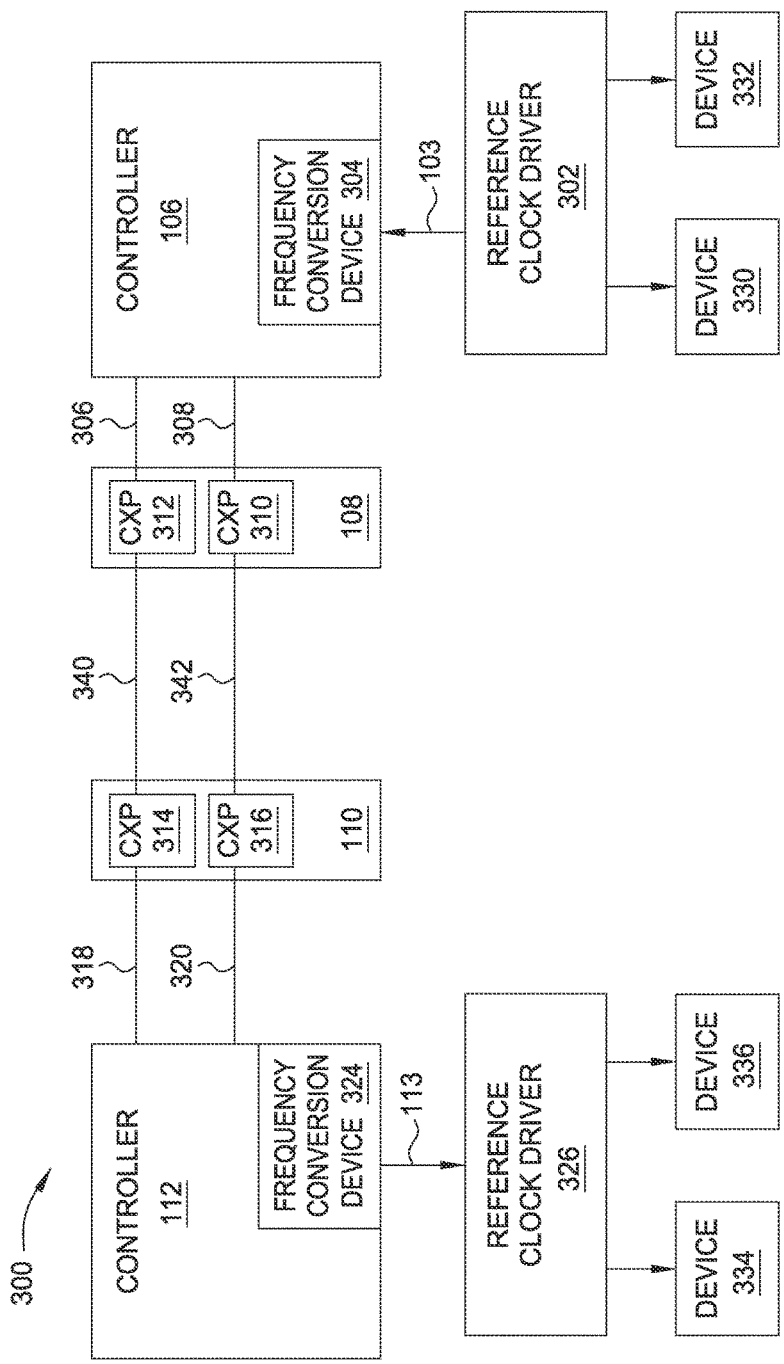
FIG. 3 is a block diagram of a system for synchronizing a reference clock and a redundant version of the reference clock, according to certain embodiments of the present disclosure.

FIG. 3 illustrates a system 300 for synchronizing and sending a redundant copy of a reference clock, according to certain embodiments of the present disclosure. As illustrated, a reference clock generator 302 may generate the reference clock signal 103, which may sent to one or more devices, such as devices 330, 332. For example, the reference clock 103 may be sent to a processor or a PCIe retimer where system 300 uses PCIe communication. As described above, the reference clock signal 103 may also be sent to the controller 106, which may include a frequency conversion device 304 to adjust the frequency of the reference clock 103 based on an operating frequency bandwidth of the optical converter 108. In certain embodiments, the controller 106 may generate a redundant copy of the reference clock. That is, the controller 106 may generate a decoded signal 306 based on the reference clock signal 103, and another decoded signal 308 based on redundant copy of the reference clock signal 103.

The decoded signals 306, 308 may be sent to the optical converter 108, which may include one or more electrical to optical converters (CXP) 310, 312 configured to convert the decoded signals 306, 308 to optical signals. The optical signals may be sent to the optical converter 110 via optical cables 340, 342. The optical converter 110 may include one or more optical to electrical converters (CXP) 314, 316. Thus, the optical converter 110 may recover the decoded signals 306, 308 via the optical to electrical converters (CXP) 314, 316, respectively. The recovered decoded signals 318, 320 may be sent to the controller 112, which may recover the reference clock signal 103. For example, the controller 112 may generate a clock signal, having a frequency within the pass-band of the optical converters 108 and 110, and adjust the frequency of the clock signal via a frequency conversion device 324 to recover the reference clock 103. The recovered reference clock signal 113 may be sent to a reference clock driver 326 that may distribute the reference clock signal 113 to one or more devices, such as devices 334, 336, which may include a PCIe switch or a PCIe retimer.

Figure 4:
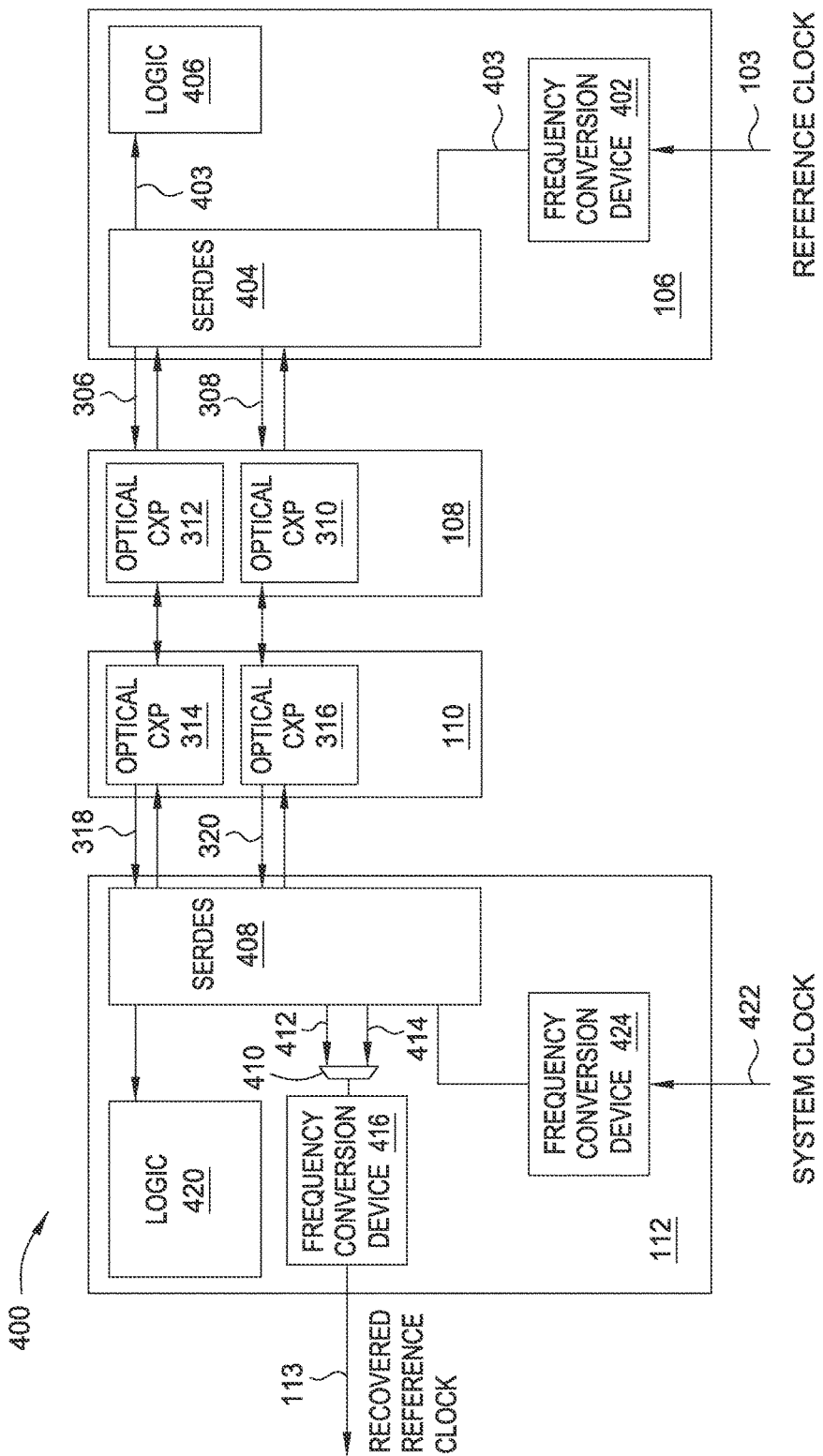
FIG. 4 is a block diagram of a system for synchronizing a reference clock using a serializer-deserializer (SERDES), according to certain embodiments of the present disclosure.

FIG. 4 illustrates a block diagram of a system 400 for synchronizing a reference clock signal 103, according to certain embodiments of the present disclosure. As illustrated, the controller 106 (e.g., a field programmable gate array (FPGA)) may receive the reference clock signal 103, which may have a frequency of about 100 MHz. In certain embodiments, the reference clock signal 103 may be used as a common-reference clock for PCIe communication. The controller may include a frequency conversion device 402, which may be a PLL. The frequency conversion device 402 may adjust the frequency of the reference clock signal 103, for example, to 125 Mhz.

In certain embodiments, the controller 106 includes a SERDES device 404, which may include an array of SERDES. The frequency adjusted reference clock signal 403 may be sent to the controller logic 406 to be used as a system clock for the controller's operations via, for example, the SERDES device 404. The SERDES device 404 may also receive and perform another frequency conversion on the frequency adjusted reference clock signal 403 (e.g., 125 MHz clock) such that the clock signal 403 frequency is adjusted to be within the pass-band of the optical converter 108. For example, the SERDES may generate 1.25 GHz decoded signal 306 (e.g., 8B/10B decoded signal), as well as a redundant copy of the decoded signal 308. The decoded signals 306, 308 are converted to optical signals via the respective electrical to optical converters 312, 310 of optical converter 108, and recovered via another optical converter 110 via respective optical to electrical converters 314, 316. The recovered decoded signal 318, and recovered redundant copy of the decoded signal 320 may be converted to clock signals via SERDES 408, and frequency adjusted to generate a recovered frequency adjusted reference clock signal 412, and a recovered frequency adjusted redundant reference clock signal 414. For example, the clock signals 412 and 414 may be at 125 MHz.

The controller 112 may also include a multiplexer 410 configured to switch between the clocks 412 and the redundant copy thereof 414. For example, the controller may determine whether reference clock signal 412 is experiencing a failure and switch the clock used to generate a common reference clock for communication between target and host devices from the clock signal 412, to the redundant version thereof 414 (e.g., by controlling the multiplexer 410 via a control signal). The output of the multiplexer 410 (e.g., clock 412 or 414) may be sent to a frequency conversion device 416 (e.g., a PLL) to generate a recovered reference clock signal 113 (e.g., adjust the frequency of the clock signal 412 or 414 to 100 MHz).

In certain embodiments, the controller 112 may also receive a system clock signal 422, which may be sent to and used for the operations of the SERDES 408 and controller logic 420. In certain embodiments, the system clock frequency may be frequency adjusted via a frequency conversion device 424 (e.g., a PLL) based on a required system clock frequency of the controller 112.

Figure 5:
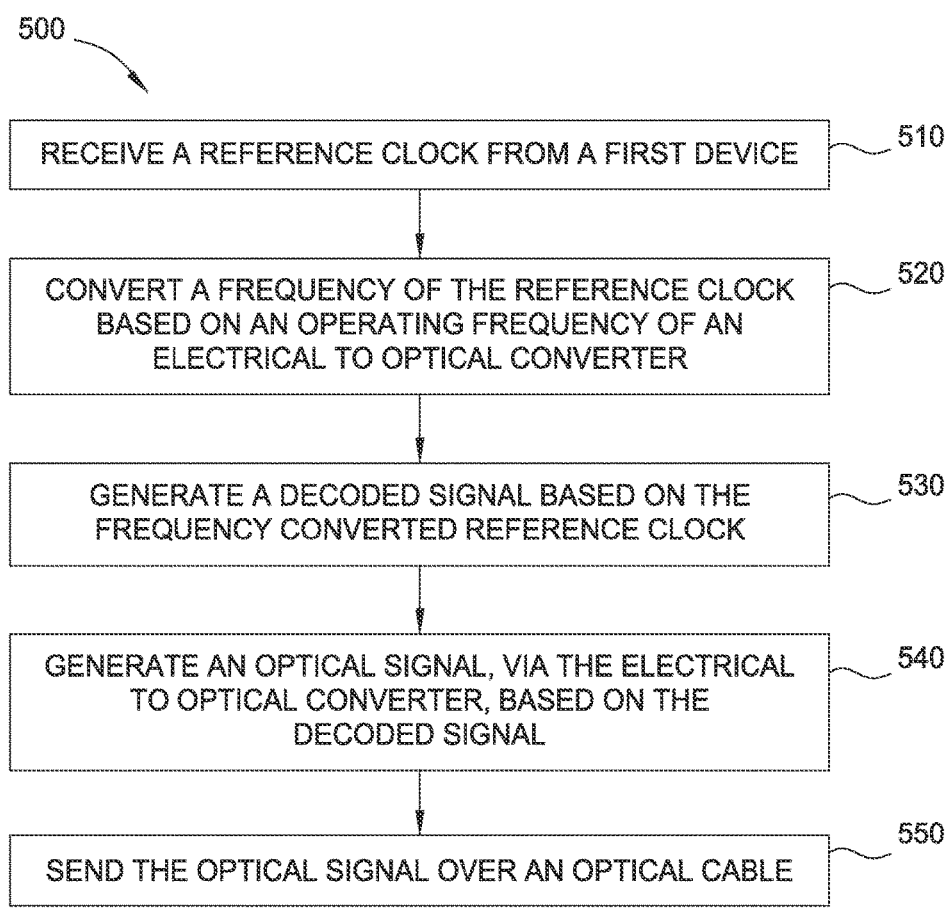
FIG. 5 is a flowchart of a method for synchronizing a reference clock, according to certain embodiments of the present disclosure.

FIG. 5 is a flowchart of a method 500 for synchronizing a reference clock, according to certain embodiments of the present disclosure. Although the method steps are described in conjunction with the systems of FIGS. 1-4, persons skilled in the art will understand that any system configured to perform the method steps, in any order, falls within the scope of the present invention. In various embodiments, the hardware and/or software elements described above in FIGS. 1-4 can be configured to perform the method steps of FIG. 5.

As shown, the method 500 begins at step 510 by receiving the reference clock from a first device. For example, the controller 106 may receive the reference clock 103 from a host device 102. At step 520, the method includes converting a frequency of the reference clock based on an operating frequency of an electrical to optical converter (e.g., optical converter 108). For example, the frequency conversion device 402 may convert the frequency of the reference clock 103 to generate a frequency converted reference clock 403.

At step 530, the method further includes generating a decoded signal (e.g., decoded signal 306) based on the frequency converted reference clock 403. The method further includes, at step 540, generating an optical signal, via the electrical to optical converter (e.g., CXP 312), based on the decoded signal, and at step 550, sending the optical signal over an optical cable.

Figure 6:
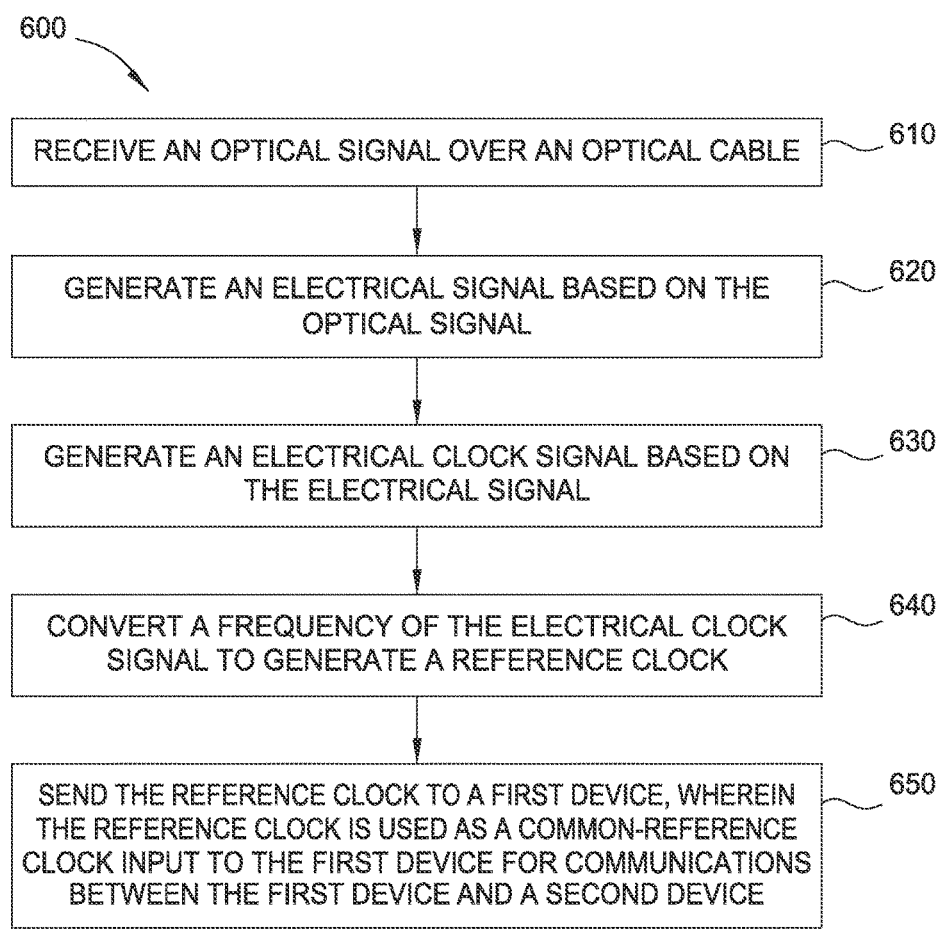
FIG. 6 is a flowchart of a method for recovering a reference clock, according to certain embodiments of the present disclosure.

FIG. 6 is a flowchart of a method 600 for synchronizing a reference clock. Although the method steps are described in conjunction with the systems of FIGS. 1-4, persons skilled in the art will understand that any system configured to perform the method steps, in any order, falls within the scope of the present invention. In various embodiments, the hardware and/or software elements described above in FIGS. 1-4 can be configured to perform the method steps of FIG. 6.

As shown, the method 600 begins at step 610 by receiving an optical signal over an optical cable. For example, the CXP 314 may receive an optical signal from CXP 312. The method further includes, at step 620, generating an electrical signal based on the optical signal. For example, the CXP 312 may generate the electrical signal 318, which may be sent to controller 112.

At step 630, the method further includes generating an electrical clock signal based on the electrical signal. For example, the SERDES 408 of the controller 112 may decode the electrical signal (e.g., decoded signal 318). At step 640, the method further includes converting a frequency of the electrical clock signal (e.g., via frequency conversion device 416) to generate the reference clock 113. At step 650, the method further includes sending the reference clock 113 to a first device (e.g., target device 104 of FIG. 1), wherein the reference clock 113 is used as a common-reference clock input to the first device for communications between the first device and a second device (e.g., host device 102 of FIG. 1).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. An apparatus for synchronizing a reference clock, comprising:
   a frequency conversion device configured to:
      receive the reference clock from a first device; and
      convert a frequency of the reference clock based on an operating frequency of an electrical to optical converter;
   a controller configured to generate a decoded signal based on the frequency converted reference clock;
   the electrical to optical converter configured to:
      generate an optical signal based on the decoded signal; and
      send the optical signal over an optical cable.

2. The apparatus of claim 1, wherein the decoded signal comprises an 8b/10b decoded signal, and wherein the controller is configured to generate the 8b/10b decoded signal by mapping 8-bit symbols to 10-bit symbols of the reference clock.

3. The apparatus of claim 1, wherein the controller is configured to generate the decoded signal via a serializer-deserializer (SERDES).

4. The apparatus of claim 1, wherein:
the controller is further configured to:
generate another decoded signal based on the reference clock;
the electrical to optical converter is configured to:
generate another optical signal based on the other decoded signal; and
send the other optical clock signal over another optical cable.

5. The apparatus of claim 1, wherein the frequency conversion device comprises a phase-locked loop (PLL).

6. The apparatus of claim 1, wherein the reference clock is used for communication over Peripheral Component Interconnect Express (PCIe) between the first device and a second device.

7. An apparatus for synchronizing a reference clock, comprising:
an optical to electrical converter configured to:
receive an optical signal over an optical cable; and
generate an electrical signal based on the optical signal;
a controller configured to generate an electrical clock signal based on the electrical signal; and
a frequency conversion device configured to:
convert a frequency of the electrical clock signal to generate the reference clock; and
send the reference clock to a first device, wherein the reference clock is used as a common-reference clock input to the first device for communications between the first device and a second device.

8. The apparatus of claim 7, wherein:
the electrical signal comprises a decoded signal; and
the controller is configured to generate the electrical clock signal based on the decoded signal.

9. The apparatus of claim 8, wherein the decoded signal comprises an 8b/10b decoded signal generated by mapping 8-bit symbols to 10-bit symbols of a clock signal.

10. The apparatus of claim 7, wherein the controller is configured to generate the electrical clock signal via a serializer-deserializer (SERDES).

11. The apparatus of claim 7, wherein:
the optical to electrical converter is further configured to:
receive another optical signal, wherein the other optical signal is generated based on the reference clock; and
convert the other optical signal to another electrical signal; and
the controller is configured to generate another electrical clock signal based on the other electrical signal; and
the frequency conversion device is configured to convert a frequency of the other electrical clock signal to generate another reference clock.

12. The apparatus of claim 11, further comprising a multiplexer configured to switch the common-reference clock input to the first device from the reference clock to the other reference clock based on a control signal from the controller.

13. The apparatus of claim 7, wherein the frequency conversion device comprises a phase-locked loop.

14. The apparatus of claim 7, wherein the controller comprises a field programmable gate array (FPGA).

15. The apparatus of claim 7, wherein the reference clock is used for Peripheral Component Interconnect Express (PCIe) communications between the first device and the second device.

16. A system for synchronizing a reference clock, comprising:
a first frequency conversion device configured to:
receive the reference clock from a first device; and
convert a frequency of the reference clock based on an operating frequency of an electrical to optical converter;
a first controller configured to generate a decoded signal based on the frequency converted reference clock;
the electrical to optical converter configured to:
generate an optical signal based on the decoded signal; and
send the optical signal over an optical cable; and
an optical to electrical converter configured to:
receive the optical signal over the optical cable; and
recover the decoded signal based on the optical signal;
a second controller configured to generate an electrical clock signal based on the decoded signal; and
a second frequency conversion device configured to:
convert a frequency of the electrical clock signal to recover the reference clock; and
send the reference clock to the second device.

17. The system of claim 16, wherein the decoded signal comprises an 8b/10b decoded signal, and wherein the first controller is configured to generate the 8b/10b decoded signal by mapping 8-bit symbols to 10-bit symbols of a clock signal.

18. The system of claim 17, wherein the first controller is configured to generate the decoded signal via a serializer-deserializer (SERDES).

19. The system of claim 16, wherein:
the first controller is further configured to generate another decoded signal based on the reference clock;
the electrical to optical converter is configured to:
generate another optical signal based on the other decoded signal; and
send the other optical signal over another optical cable;
the optical to electrical converter is configured to recover the other decoded signal based on the other optical signal; and
the second controller is further configured to generate another electrical clock signal based on the recovered other decoded signal; and
the second frequency conversion device is configured to convert a frequency of the other electrical clock signal to generate another reference clock, wherein the second controller is further configured to determine whether to switch the reference clock sent to the second device from the reference clock to the other reference clock based on a control signal from the second controller.

20. The system of claim 16, wherein the reference clock is used for communication over Peripheral Component Interconnect Express (PCIe) between the first device and the second device.

* * * * *